United States Patent [19]

Iwan et al.

[11] 4,292,657

[45] Sep. 29, 1981

[54] PARTITIONABLE FLEXIBLE DISK PACK

[75] Inventors: Wilfred D. Iwan, Sierra Madre; Ko K. Gyi, Thousand Oaks, both of Calif.

[73] Assignee: Burroughs Corporation, Detroit, Mich.

[21] Appl. No.: 40,956

[22] Filed: May 21, 1979

[51] Int. Cl.³ .................. G11B 5/82; G11B 25/04
[52] U.S. Cl. .................. 360/98; 360/99; 360/135
[58] Field of Search .................. 360/97-99, 360/135, 133

[56] References Cited

U.S. PATENT DOCUMENTS 3,513,568  5/1970  Shoford, Jr. et al. .............. 35/74 X 4,148,084  4/1979  Gyi .............................. 360/99

*Primary Examiner*—John H. Wolff
*Attorney, Agent, or Firm*—John J. McCormack; Nathan Cass; Kevin R. Peterson

[57] ABSTRACT

Disclosed are flexible disk packs formed of disks which have an engagement section along their periphery, this section being adapted to be engaged by associated partition wedge means; in one embodiment each disk is made identical and includes a "partition edge"; then the disks are stacked so that each edge occupies a unique angular position in the stack—this facilitating engagement of any edge by the wedge, according to when the wedge is activated; whereby to effect pack-partition and exposure of a "selected" disk surface for transducer access.

12 Claims, 13 Drawing Figures

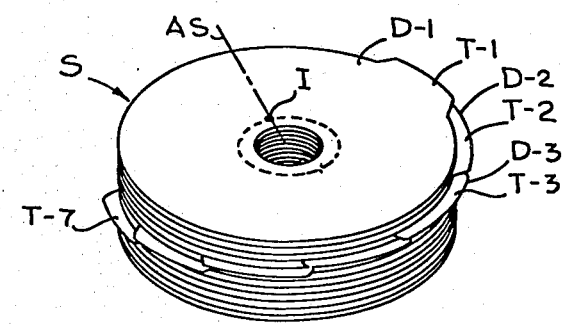
Fig. 1
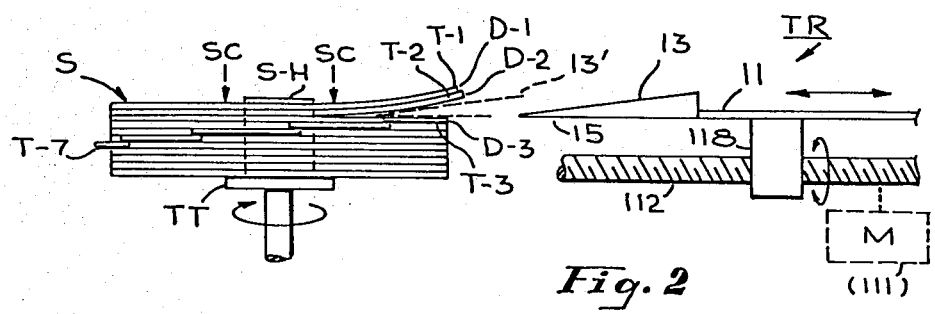
Fig. 2
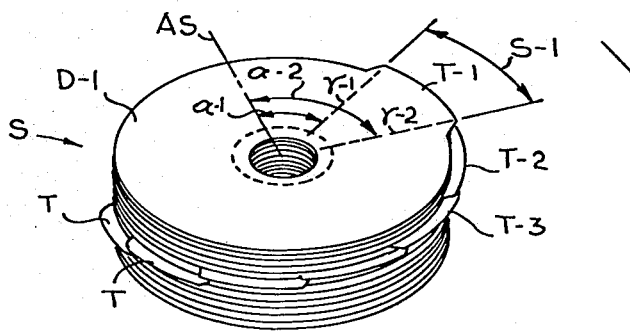
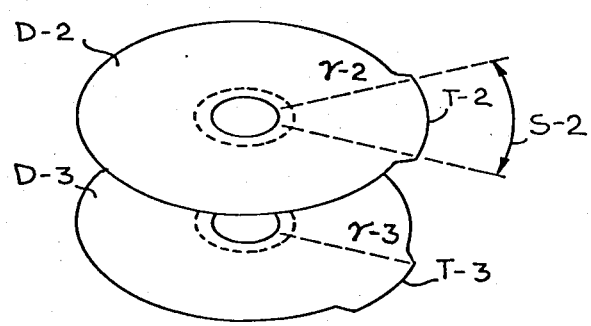
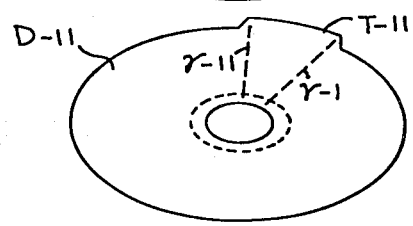
Fig. 1A

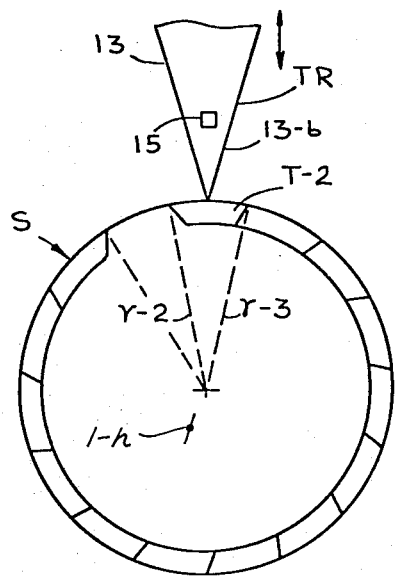
Fig. 3
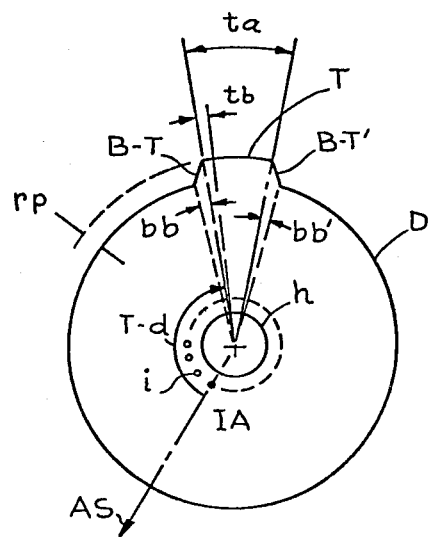
Fig. 5
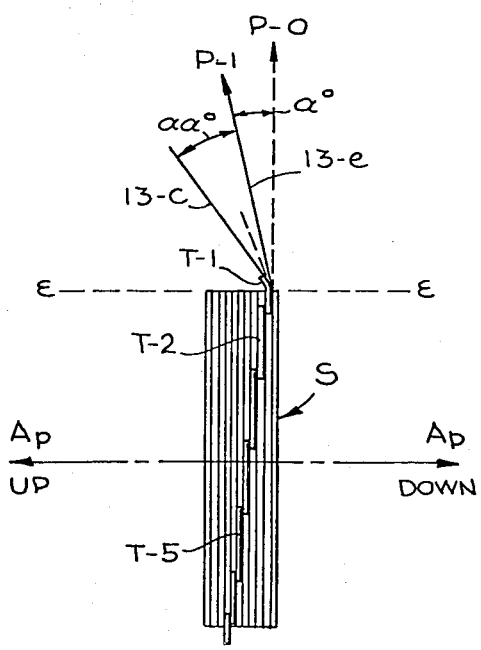
Fig. 4-A
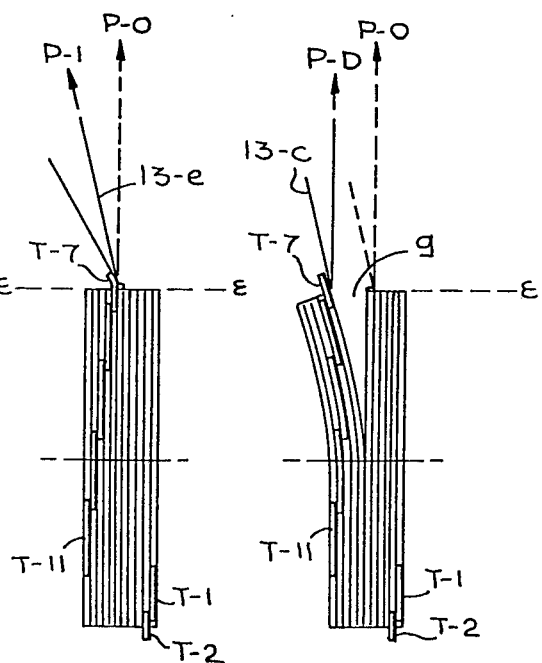
Fig. 4-B
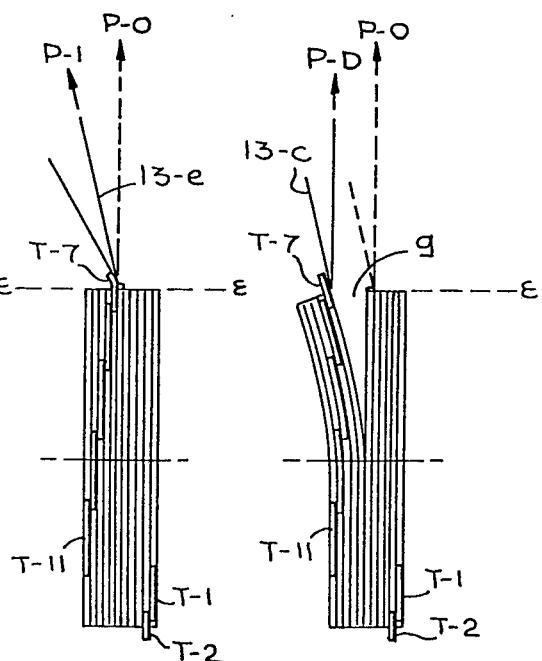
Fig. 4-C

PARTITIONABLE FLEXIBLE DISK PACK

CROSS REFERENCE TO RELATED APPLICATION

This application is referenced to Ser. No. 813,079 filed in the United States Patent and Trademark Office on July 5, 1977 now U.S. Pat. No. 4,148,084, issued Apr. 3, 1979 by Ko Ko Gyi for "Flexible Disk Pack, Related Storage Apparatus Having Disks with Circumferential Tab Segments and Associated Partition Means" and commonly assigned herewith.

BACKGROUND AND FEATURES OF INVENTION

This invention relates to methods for handling disk recording media and in particular to novel improved techniques for partitioning disk packs, especially packs of flexible disks.

In the art of recording and manipulating data on disk recording media and associated record handling equipment, workers are aware of certain shortcomings in present day technology and of desirable features, not as yet practically implemented. Disk media are now widely used, especially in data processing—commonly in the form of flexible, or "floppy", disks. This invention is intended to teach novel methods of separating stacked disks from one another.

Workers are quite aware that floppy disk media are becoming increasingly attractive for use in the data recording arts, especially as associated with automatic data processing equipment, but that such media present certain problems not as yet fully resolved to their satisfaction. One such problem is that of simply and practically organizing a pack of floppy disks so as to be readily and conveniently accessed by transducer means in the precise rapid manner that is typically required for data processing. The tissue-thin floppy disk is obviously not easy to position or manipulate, being relatively unwieldy and difficult to precisely and quickly manipulate in partitioning. This invention provides a novel technique of partitioning—doing so automatically and with equipment that is relatively simple and cost-effective, yet that presents little hazard to the integrity of the fragile disk or its recorded contents.

PRIOR ART

One prior art approach to this problem is to arrange the floppy disk pack into disk "sub-groups", wherein each disk in a group has a different diameter—such as shown in the IEEE Transactions on Magnetics of September 1972 (see pages 574–576 in an article entitled "Proposal for $10^{12}$ Flexible Disk Pack Memory", by Pohm and Zingg).

In a related selection arrangement for a pack of "staggered-diameter" disks, a disk is separated from the pack by forcing a pair of blades of slightly differing length against the pack in a "prying" action. A related system is shown in U.S. Pat. No. 3,931,645 to Dodd, et al., issued Jan. 6, 1976. These methods will be recognized as having significant shortcomings.

Another prior art approach has been to configure each disk with a notch extending about one-half of the disk periphery, with a corresponding boss extending along the other half. The disks are stacked with this boss/notch pattern staggered to present a "spiral thread" on the outside of the pack. Such a stack is accessed and partitioned by a partition knife which tracks this "spiral thread", wending its way axially until it engages the appropriate boss,—whereupon it is thrust horizontally into the stack for the partition. (Note: IBM Technical Disclosure Bulletin, Vol. 16, No. 10, March 1974, pages 3377, 3378, "Flexible Disk Recording Library" by R. A. Billings). Such an arrangement has many disadvantages, such as extended access time (many stack revolutions required, especially between extreme disks), the necessary vertical translation of the knife and transducer assembly, the frontal impact of the knife against the disk edge, etc.

The present invention is intended to overcome the foregoing and other disadvantages of prior art structures and methods and to provide the mentioned, and other, features and advantages according to a novel design.

More particularly, this invention teaches techniques and associated means for effecting a partitioning of a flexible disk pack wherein a sectorial engagement means (cam sector) is provided on each disk in the pack, such means being sequentially staggered into different unique positions about the periphery of the pack, and wherein a related partition wedge arrangement is also provided.

This invention is intended to improve flexible disk file rotating magnetic memories, and especially to facilitate a simple, rapid mechanical access to any disk in such a stack, while yet maintaining simplicity of disk design and access equipment, as well as promoting increased volumetric efficiency in disk storage.

The foregoing and other features, objects and advantages according to the present invention will be more fully appreciated and become more apparent upon consideration of the following detailed description of preferred embodiments, taken in conjunction with the attached drawings, wherein like reference symbols denote like parts.

BRIEF DESCRIPTION OF THE DRAWINGS

FIG. 1, including 1A, is an upper schematic perspective view of a pack of flexible disks exhibiting peripheral "tab sectors" according to one type of engagement for partition, the pack being shown illustratively-partitioned in FIG. 2, an associated schematic sectional view of the pack in FIG. 1 shown in functional relation with a schematically indicated partitioning knife; the pack being shown more fully in illustrative exploded fashion in FIG. 1A;

FIG. 3 shows the pack and associated partitioning wedge of FIGS. 1 and 2 in schematic plan view, with FIGS. 4A–4C providing a schematic side sectional showing of the successive functional relation between wedge and tabs during an illustrative partition sequence; while the layout of an individual illustrative disk is shown in FIG. 5;

FIG. 9 is a plan view of a preferred disk, while

DETAILED DESCRIPTION OF RELATED EMBODIMENTS

Figure 6:
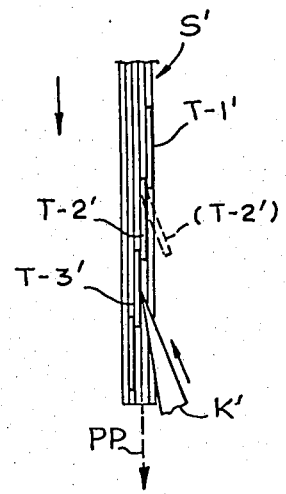
FIG. 6 indicates, in a very schematic side sectional view, an illustrative operative interrelation of such a disk pack and an associated partitioning wedge means like those in FIGS. 1–5; while such a pack is shown "partly-partitioned" by a modified partitioning wedge means in the similar view of FIG. 7.

FIGS. 1-3 schematically illustrate a pack S of flexible (pliant or "floppy" type) disks D, adapted for "tab-partitioning" according to one aspect of the subject concept. That is, disks D are each provided with a partitioning tab T and are suitably oriented and stacked into pack S to be co-rotated, transducer-accessed and otherwise manipulated as a unit, as known in the art. All the flexible record disks D will be understood as coaxially disposed and supported by a central rotatable spindle, being adapted to be rotated under prescribed control as known in the art. The disks and related manipulation means will be understood as constructed and operated conventially, as known in the art, except as otherwise mentioned.

More particularly, pack S is here comprised of eleven (11, or any suitable number) floppy disks D-1, D-2, etc., through D-11. Each disk has an associated, radially-projecting partition tab T of identical shape and dimensions, provided and oriented (once the disks are properly stacked in the pack) to facilitate selection and partitioning of that disk, or an associated disk, with certain partition wedge means. Thus, for instance, disk D-1 is provided with tab T-1, disk D-2 with tab T-2, etc., through disk D-11 with tab T-11. The disks are stacked as indicated with each tab disposed at a unique successive angular position about the pack, yet with adjacent tabs overlapping in sequence.

Thus, tab T-1 on disk D-1, is oriented to occupy associated sector S-1, defined between a pair of radii, R-1, R-2, displaced angularly from the pack's "start axis", AS, by angles a-1, a-2, respectively. Tab T-2 for disk D-2 is similarly disposed with an identically configured tab T-2 occupying an adjacent, but overlapping, sector S-2 of the same angular size, as indicated in FIG. 1A. "Start axis", AS, is preferably and as known in the art, aligned with the index bore I formed by registration of all index holes in disks D. Pack S may be held together with rivets at bonding sites "b", or as otherwise known in the art.

Stack S, as indicated functionally in FIG. 2, is adapted to be rotated as a unit, as known in the art; such as on turntable TT, and to be brought operatively adjacent a partition/transducer assembly TR, including a partitioning wedge blade 13, and an associated transducer array 15.

More particularly, transducer assembly TR will be understood in the illustrative array, as including wedge 13 as the means for splitting pack S for transducer access. Of course, workers in the art will visualize other related implementations and implementing details, not shown here. Assembly TR will be understood as comprising a carriage including a carrier arm 11, carrying a transducer array 15 and threadedly engaged at coupling 118 to a lead screw 112 for axial reciprocal translation into, and out of, pack S (see arrow). Appropriate controlled rotation of lead screw 112 will effect this as known in the art. (E.g., by transducer drive 111 coupled to rotate screw 112, as known in the art, and controlled in a known manner to effect this linear pack-insertion and transducer engagement, and retraction at prescribed times). Thus, any given (upper) disk surface may be accessed and operated-upon according to this feature by simple, reliable means which are easy to implement and operate as known in the art.

Generally speaking, it will be understood that, with pack S mounted on turntable TT and rotated appropriately, the distal end of wedge 13 may be advanced to contact a certain selected tab T on a "partitioned disk" to effect partitioning thereof (see phantom position of TR in FIG. 3). This "partitioned" (or deflected) disk will be understood as the disk adjacent the disk surface to be exposed for transducing contact with transducer 15. Wedge 13 will thus be understood as advanced during partitioning so as to contact the designated tab precisely when the rotating pack brings that tab adjacent the wedge—this occuring at a particular associated angular position of pack S during its rotation—next, deflection of the wedge and a further advancement of wedge 13 into the pack S will be understood as completing partition, deflecting the engaged disk, and all those above it, ever further and further away from the "selected" disk-surface.

The recording circuits and transducers may be of conventional design, as may the transducer actuation mechanisms and related control means. The transducer assembly TR will be understood as relatively conventional, except where otherwise mentioned, including a linearly translateable carriage 11 carrying a pivotably translateable partition hood-knife assembly 13 and transducer array 15, protectively disposed under the wedge-shaped assembly 13. Carriage 11 mounted on lead screw array 112 via a coupling 118; will be understood as reciprocated by controlled rotation means (not detailed—see motor 111, FIG. 2) understood as rotating precision lead screw 112 so as to advance TR as desired. The linear positioning of assembly TR will thus be understood as effected by conventional means which are not shown in detail—e.g., alternatively a voice coil having a linear tachometer providing translation accuracy sufficient to position the arm and partitioning knife as indicated. The control means will thus be understood as arranged and adapted to linearly reciprocate and position the partitioning wedge 13 radially of the disk pack S.

Wedge 13 is preferably also made pivotable along the stack axis direction so as to pry open the stack initially for better, smoother entry of the wedge point. Such pivoting means is not shown, but implementing details are well known in the art. The pivot means is provided to move the wedge point in the direction of the pack axis at a prescribed time, once the selected tab is engaged, as further described below. Entry of the partitioning blade between a pair of adjacent flexible disks will, of course, urge the compliant disks apart, carrying along adjacent disks in this axial thrust, this action being known in the art as "partitioning" or "pack-splitting".

Thus, in the illustrative arrangement of FIGS. 1 and 2, the upper surface of disk D-3 will—for example—be understood as "selected" for access by transducer array 15 with overlying disks D-1 and D-2 to be deflected, being thrust upwards and away, by wedge-shaped partition blade 13. Accordingly, the selection of D-3 will be implemented by angular rotation of pack S with respect to the "injection path" of wedge 13 to bring tab T-2 into registry with this injection-path. At this exact time, transducer array TR is advanced sufficient to contact the leading edge of wedge 13 with tab T-2, so the wedge may raise disk D-2 (also D-1) away from selected disk surface D3. Further advancement of the transducer array into pack S will further divert disks D-1, D-2, and eventually bring transducer 15 into operative engagement with the upper surface of disk D-3.

FIG. 2 illustrates this engagement of tab T-2 to deflect disks D-1, D-2 away from disk D-3, with the end of wedge 13 advanced toward pack S to engage tab T-2 precisely when rotation of pack S has brought these into operative relation opposite one another. The tab, along with disks D-2 and D-1, may then be diverted away from "selected" upper disk surface D-3 by upward pivoting of knife 13 and further advancement of the "wedge-shaped" point into the pack S, as indicated in phantom at 13'.

According to a related feature, blade 13 is wedge-shaped, with a relatively smooth, convex upper guide-surface adapted to smoothly engage the underside of a deflected disk (underside of disk D-2) and deflect it gently over the transducer array while the pack is rotating. (Disk D-1, D-2 also flex and bend along a prescribed flexing portion). Thus, the upper body of wedge 13 serves as a guide, or disk-deflecting/bending form, both bending the upper pack open for partitioning and then deflecting it further as it passes over the transducers. Preferably, this guide takes the form of a partial "conic section" as illustrated.

The upper surface of wedge-shaped blade 13 expands this partition gap more and more as assembly TR advances further into pack S—and eventually transducer array 15 is engaged operatively with "selected" surface D-3 for conventional transducer manipulation thereon as known in the art. Thus, partition may be quite simply and selectively effected and controlled, with the "entry" of the partition (tab-engaging) means, timed and controlled according to the circumferential (rotational) position assumed by pack S.

Workers in the art will readily appreciate that such an "overlapping tab" arrangement shortens access time by facilitating a partitioning sequence within about one pack revolution, or less (for packs up to about 3–5 dozen disks—with comparable reduction for larger packs). By contrast, the access time required in the arrangement of the cited Billings article is about 5–6 revolutions for a pack of only 10–12 disks.

Workers will contemplate other ways of implementing the described preferred "pivoting-wedge" mode of partitioning. Of course, such a tab-array may also be partitioned in other related ways. For instance, an inclined blade may be employed where a pry, or like wedge, is advanced against the tab and deflected disks at an angle to their normal plane. Likewise, this mode may be combined with the "pivoting wedge" action as indicated in FIGS. 4A–4C where the blade's entry-path is inclined toward the "selected" disk (as though to intersect it), and given sufficient advancement against the "selected-tab", the knife then be pivoted away from the "selected disk" to initiate a partition-gap and accommodate facile pack entry. Thus, as illustrated in FIGS. 4A, 4B and 4C, the transducer array TR, with its associated blade edge 13-e may quite conveniently be reciprocated between a "quiescent" attitude relative to the plane of disks D and an "actuated", diverting attitude. This wedge point may be simply "walked upstairs" along the sequentially staggered overlapping tabs T, until, upon reaching the tab of the "diverted" disk, the blade is pivoted into a prescribed "actuated" partitioning condition. Significantly, and by contrast with prior art arrangements, the knife need not "hunt", or be translated axially of the pack; and it need not be controlled or position-referenced with respect to pack (axial) position. Rather it may simply be "engaged" with a selected tab and then "inserted" in a uniform two-step fashion, (pivot, then advance in) the same way every time—controlling disk-selection simply according to when, in a given pack-rotation cycle, these steps are invoked.

Thus, for instance, in FIG. 4A pack S is very schematically shown with the transducer array advanced sufficient to barely engage the tabs with the point 13-e of blade 13 (point coincident with contact axis E—E). Here, pack S is rotated to a "start point" so that wedge point 13-e engages the "bottom-most" tab T-1 associated with flexible disk D-1. This may be called the "start condition". It will be understood that, here, the rotational position of the disk pack relative to the wedge point is such as to dispose the relatively flat distal surface of knife point 13-e along a prescribed plane P-1—this plane P-1 being at the prescribed relatively acute angle alpha $\alpha$, with respect to a reference plane P-0 which is relatively parallel to the planes of the disks in pack S. The opposite surface 13-c of point 13-e is offset from plane P-1 by a few degrees (aa° defining the wedge, or point) and is urged against tab T-1.

Now, with pack S rotating it will be recognized that the blade edge, so-engaged, will, in effect, be swept about the pack periphery, sliding gently over successive overlapped tabs—from tab T-1 to T-2, etc.—the while the plane of this tab-wedge engagement, may be advanced (axially of pack S—i.e., along direction AP—AP) by (up to) eleven disk thicknesses, from D-1 to D-11. Of course, to maintain contact this knife edge 13-c must be biased somewhat by appropriate means (not shown but well known). Alternatively it may be tilted or be vertically raised, etc., by techniques known in the art.

Thus, for example, assume that the upper surface of disk D-6 is to be exposed so that disks D-7 through D-11, must accordingly be diverted upward (i.e., to the left in FIGS. 4B and 4C). In FIG. 4B, pack S will be understood as having rotated sufficient to "walk" the blade point (cam surface 13-c) "upward" (to the left along direction AP—AP) across tabs T-1, T-2, etc., until it is now engaged ("engaged condition") with tab T-7 of disk D-7,—D-7 being the disk to be diverted, along with its neighbor disks.

At this precise moment during the rotation of the stack, point 13-e will be understood as being quickly pivoted "upward" (to the left, along direction AP—AP, as indicated schematically in FIG. 4C) carrying disks D-7 through D-11 up with it, to thereby initiate the partitioning and splitting the pack for transducer entry and exposure of the surface of selected disk D-6 ("pivoted condition"). Then, with a partition gap "g" thus generated, the wedge-shaped semi-conic hood 13 may be further injected (along with transducers 15) to complete the necessary partitioning for the transducing desired ("initial entry").

Workers in the art will readily appreciate the very simple mechanical design and operative mode of such a "tab wedge" partitioning arrangement; especially when so used with a circumferentially-staggered array of overlapping disk tabs. The technique of simply engaging the partition wedge with the tab of an end-most disk for every selection-partitioning sequence and allowing it to "walk-up" the array of "tab-stairs"—until it is actuated against the selected tab—provides a very simple, reliable two-step partition action.

By contrast, workers will recall how it has heretofore been considered necessary to translate partitioning means axially of the disk pack, while meticulously referencing and controlling its axial position relative to the pack. Eliminating the need for this will be recognized as avoiding a good many problems, complexity, expense, etc. With the above arrangement it is merely necessary to engage the partition wedge with any reference portion of the pack periphery (tabs—e.g., with bottom-most tab T-1 in every case), and, depending upon how far the pack is swept angularly, actuate the blade a prescribed constant amount [i.e., advance it, at times also pivoting it] when the designated tab passes—the only control, and only variable, necessary being to determine "actuate-time"—the partition-mode otherwise being uniform and unvarying. Thus, there is no longer any need to vertically translate a partitioning array (though this is a possible option), nor any need to reference its axial position relative to a particular selected disk, etc.

Workers will further recognize that other similar, relatively simple partitioning means may also be employed. For instance, instead of being pre-tilted against the tabs during "contact-mode", the partitioning knife can simply be spring-biased against them. That is, upon entering the pack and engaging initial tab T-1, the wedge 13-e may be lightly biased-upward a prescribed constant amount, sufficient to keep it engaged with all tabs as it "walks" up the tab stairway and so maintain contact despite their different locus, axially along the pack (between the extreme tabs T-1 and T-11).

Similarly, and in a slightly different variation, the contact angle and/or the extent of pivoting excursion (of the partitioning blade) may, in certain instances, be made variable. Thus, pivot excursion may be made to depend upon which tab is engaged; or the contact angle may be controlled to be progressively greater as one proceeds from the first tab (T-1) to the last (T-11). (The pivoting force being cyclically controlled to increase during the pack rotation—i.e., the scan cycle—during which tabs T-1 through T-11 are swept past the partition knife 13, etc.).

Disk construction (FIG. 5)

The "tabbed disks" above described may be fabricated by conventional known methods, such as by stamping them from mylar sheet stock. Preferably, the disks are formed to be identical and interchangeable. One technique for doing this is to cut every disk into a common single pattern, with the same tab and an array of "duplicate" index holes distributed about them, as described below. These disks may be stacked in sequence to effectuate the indicated "overlapping tab" array, with each disk in the stack successively "offset" (rotated) a prescribed common "offset angle", with the "duplicate" index holes so arranged that they will form a single "index bore" running through the stack once the disks are so piled.

FIG. 5 illustrates in schematic plan view a single disk D (from the pack S in FIGS. 1 through 4) having a center-hole H for engagement with a turntable spindle and an array IA of duplicate index holes "i"—one hole for each disk to accommodate the mentioned "offset stacking". Illustrative tab T is indicated as spanning (in its central portion) a prescribed sectorial angle (ta°), with symmetric flanking beveled portions BT, BT' occupying prescribed flanking sectors, bb°, bb'°. Each tab has the same sector angle "ta"; and it is defined by a pair of radial loci (r-1, r-2 for T-1; for example—r-1 being disposed a prescribed angular displacement T-d° from the start axis AS, as mentioned). The tabs extend a prescribed common distance rp beyond the disk periphery, sufficient to accommodate engagement with the contemplated partition wedge.

Of course, such an array of "tabbed disks" may be otherwise designed and fabricated—and the mode of stacking adjusted accordingly. For instance, instead of fabricating identical tabbed disks with duplicate index holes and "offset stacking" them as above mentioned, one may fabricate each disk with a single index hole i-h (e.g., along axis AS) and its tab disposed at a unique angular disposition relative thereto—so that when all disks are stacked with holes i-h in registry (no "offset stacking" here), the tabs will nonetheless exhibit the same ("staggered overlapping") sequential distribution about the pack periphery.

Figure 7:
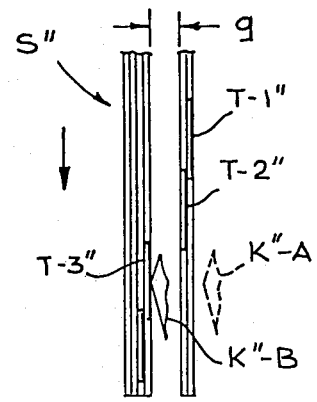

Alternate array; FIGS. 6, 7:

FIG. 6 represents, in very schematic sectional view, a modified array wherein a similar floppy disk pack S', having a similar arrangement of tabs T' is understood as to be engaged by a similar wedge-shaped partition blade (point) K'. However, pack S' is specifically rotated as indicated by the arrow so that the tabs are thrust into "edge-impacting" (splitting) engagement with the wedge point,—rather than "walking" the wedge point in the reverse direction, non-impactingly, as in the prior arrangement.

Here, for examle, it may be assumed that wedge point K' has been advanced toward the pack S' sufficient to engage tab T-3' at a time just prior to passage of adjacent tab T-2' across the wedge-entry path. Continuation of disk rotation will thus be seen to quickly impact the wedge point against the side of tab T-2' to deflect T-2' (and disk D-2, as well as adjacent disk D-1) away from the surface of disk D-3, (i.e., away from partition-plane PP—PP). Otherwise, this arrangement will be implemented as indicated above and as known in the art.

In certain instances, such a tab-knife impact will be tolerable and consistent with the expected life and the relative toughness of the tab vs. the blade structure—though in many instances it will be disfavored and a less abrasive disk-tab engagement preferred.

Another related arrangement is indicated in FIG. 7, wherein a similar pack S" will be understood as including a similar array of disks each with an associated tab T" (see successively staggered tabs T-1", T-2", T-3", etc.). With disk rotation in the direction indicated (arrow), it will be understood that an associated "V-faced" partitioning blade (point) K" will be urged normally against the tab plane to initiate an associated partition gap "g"—then, again, simply be advanced into gap "g" by translation into pack S" at the appropriate time (phase in pack rotation corresponding with registry of deflect-tab with blade). At this point, the wedge point will be advanced from a "rest condition" (indicated in phantom at K"-A) to an "actuated" condition (indicated, in full-line, at K"-B). Depressing of the engaged tab T-3" will expose the opposing surface of disk D-2 as desired. Injection of blade K" into the partition gap "g" will open it further to allow entry of the transducer assembly, as before. By comparison with the first arrangement (FIGS. 1 through 4) this will be seen as somewhat simpler, though, perhaps, a bit fussier to implement. It eliminates the technique of "walking" the wedge point along adjacent staggered tabs, in constant contact therewith; instead, invoking a somewhat more extreme "slapping" engagement against the selected tab to deflect it.

Other variations

In certain cases, with arrangements like that of FIGS. 1-4, the axial pivoting of the partition blade 13 may be eliminated, the blade, instead, simply being quickly advanced further into pack S while the selected tab is passing. For such embodiments the distal end of partition blade 13 is preferably arranged to be beveled along an appropriate lateral edge portion 13-b (FIG. 3) as well as beveled longitudinally—this lateral bevel accommodating a wedge action circumferentially of pack S via a lateral (sidewise) engagement of the tap, and of the body of the deflected disk (e.g., the body of disk D-2 deflected smoothly as blade point 13 moves from tab T further into the pack during the partition sequence). And, it may in certain instances, be more advantageous to pivot-in the partitioning blade and associated transducer array into pack S in an arcuate manner as opposed to linear translation. This may be viewed as achieving a more efficient pack-splitting than the linear actuation indicated in the embodiments.

And, according to another option, the wedge point may include a lower projection or "chin", adapted to also deflect the "selected" surface momentarily downward, while initially entering the pack, thereafter allowing it to return into a flattened condition against transducers TRR (see "chin" or double bevel on tab-engaging surface of wedge K″ in FIG. 7).

Figure 8:
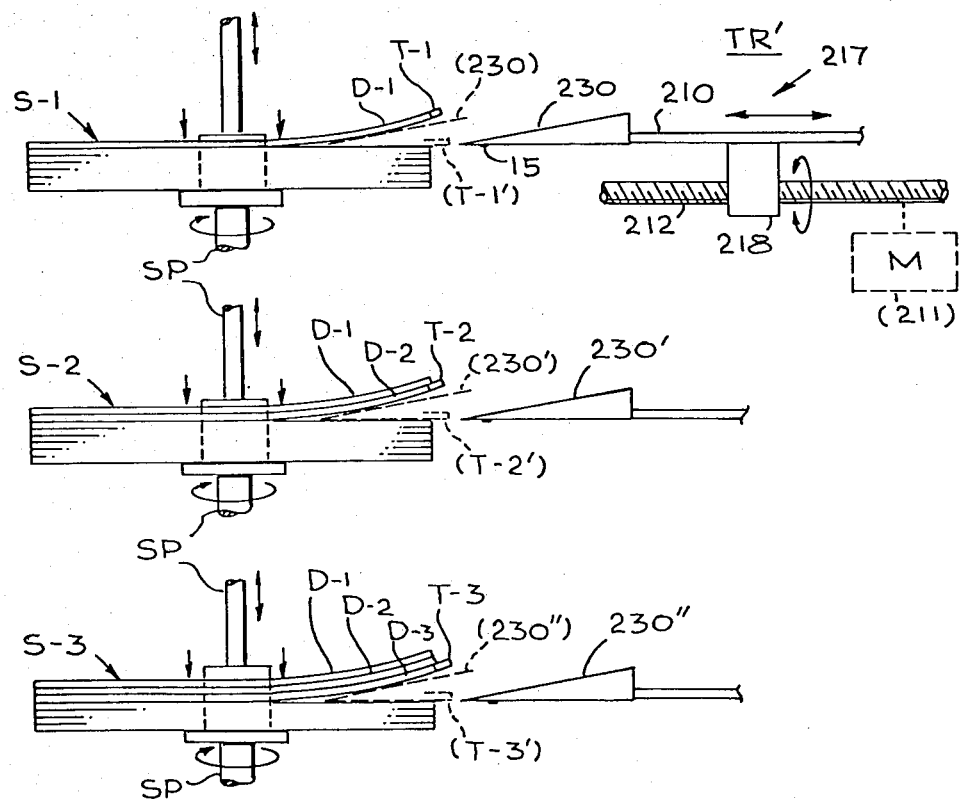
FIG. 8 shows in schematic elevation, a plurality of packs like the pack of FIG. 2, shown fragmented vertically.

Alternatively, and as a feature of convenience in certain instances, the disk stacked in pack S may be organized into a prescribed selectable number of sub-groupings as indicated in FIG. 8, each sub-grouping including a prescribed set of "tabbed disks" as above, these sets being replicated axially of the common spindle support. (See like sub-groups S-1, S-2, S-3 on support SP in FIG. 8). Here, the transducer array TR′ is essentially the same as above described except where otherwise indicated. Thus, a partition wedge arrangement 230 may be stepped axially of the overall pack to be registered selectively, with any sub-group (i.e., array 230 shown at sub-group S-1, or indexed to 230′ for sub-group S-2 or to 230″ for S-3) as controlled by the selection means and translated by means well known in the art.

Of course, the transducer array may be disposed on either or both sides of the partitioning wedge (e.g., double-opposed transducers); and, in certain instances a pair of like opposed wedges may be disposed and adapted for a "double-partition", on both sides of the selected disk, being adapted to deflect disks away from both sides.

Such tab select arrangements may be used to partition a "low speed" removable floppy pack (e.g., one housed in a jacket such as workers know), alternatively, they may be applied to similarly partition a relatively voluminous "high speed" rotatable pack deployed as known in the art non-removably on a common rotatable shaft between a pair of stabilizing plates.

Figure 9:
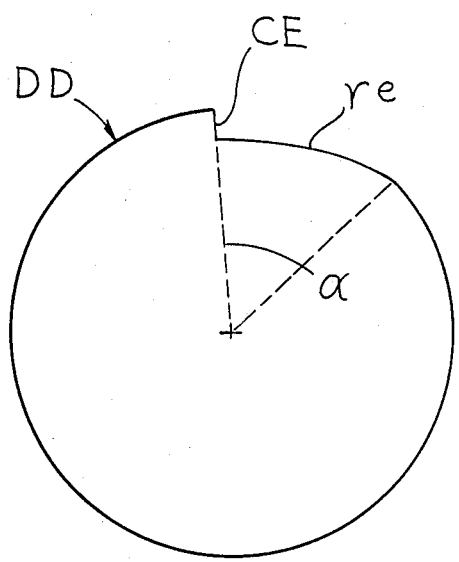
Figure 10:
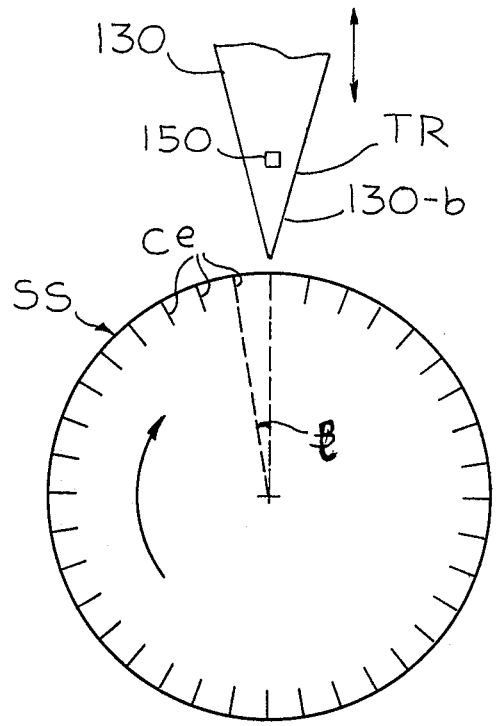
FIG. 10 shows a pack of such.

Preferred embodiment; FIGS. 9, 10

A preferred emodiment of this invention is indicated in FIGS. 9 and 10. In FIG. 9, a flexible disk DD of the type descried above is shown except that, rather than having a "tab", it is provided with a cam sector (angle $\alpha$, edge segment or re) taper-segments and cam edge CE as the partition engagement means. Here, it will be recognized that the cam edge CE lies generally along the disk radius and is adapted to engage a leading portion of the partition tool (e.g., the end 130-b of knife 130 in FIG. 10); and that edge CE is formed by introducing a gradual "recession" radially, of the radial disk width along segment re in a "cam-like" configuration. Edge CE will be long enough to properly engage the partition tool to lift the (overlying) disks in the stack—and a little longer lest it present a weak disk area, more subject to tear, etc., under partition stress. Sector re (and angle $\alpha$) are preferably made relatively long and gradually receding so as to minimize disk weakness in the area of edge CE. In this respect, such "cam-sector" disks will be recognized as ordinarily preferably to disks with projecting "tabs" as described above. Also, unlike the tabbed disks, such as "cam-sector" design allows the partitioning knife (point) to operate within the normal radial confines of the record portion of the disks (and pack), rather than external thereto. In many cases, this will be significant; and a more effective partition-lifting action will be effected—and one less likely to mechanically stress any disk portions. Moreover, one will be able to allocate less "overlap" than with the aforedescribed "tab design" in many cases—making it possible to stack more disks in a given partition grouping (e.g., see pack SS in FIG. 10 where overlap angle $\beta$ between adjacent cam edges CE is shown.

FIG. 10 will be understood as a plan view of a pack SS of such "cam-sector" disks with partition knife 130 (with R/W transducer 150), understood as constructed and operated along the lines of the aforedescribed packs and related partition means except as otherwise specified. The point 130-b of this tool will be understood as adapted to the selectively moved to within the radial confines of pack SS—sufficient only to interest (most of) the length (common) radially of edges CE—and then, be "activated" to impact a "selected" edge CE, according to when this edge passes the (now-adjacent) point 130-b, and thrust the point 130-b further radially into pack SS while also diverting the disks away from this "selected" disk. As above-mentioned, this activation may involve a mere thrust, radially-inward (e.g., just after point 130-b has, cam-wise, engaged edge CE) and/or an axial pivoting (of knife 130, axially of pack SS) or otherwise as workers can visualize.

Conclusion

Of course, alternate configurations may be contemplated to provide the same or similar advantages and features as above mentioned. For instance, in certain instances and with appropriate modification, semi-rigid disks can also be similarly configured and similarly partitioned. Moreover, where the prescribed partitioning and related translation means are characterized as mechanical, it will be apparent that alternative means such as pneumatic or hydraulic partitioning means will in certain cases also serve. For instance, a gas jet arrangement may be substituted for, or added to, the described wedge for effecting a similar thrust. Also, the cam-sector configuration may be modified in certain cases.

Further, in certain specialized cases, partitioning may also be effected after (temporarily) arresting pack rotation. Workers will also realize that various other accessory means may also be employed and that the described means may be modified. Thus, for instance, in certain instances it will be desirable to operate the disk drive so as to selectively stop, during pack rotation so as to register the wedge with a selected cam-edge (e.g., using a known rotary stepper motor digitally controlled, each step corresponding to the various pack-rotation positions associated with each disk partition). In certain cases the turntable spindle may be appropriately coupled to the drive motor and controllably rotated to effectuate this.

With the preferred embodiments of the invention thus described in detail, those skilled in the art will be able to contemplate certain modifications in structure and/or in method over that illustrated and described and/or may contemplate the substitution of equivalent elements for some or all of those disclosed, while nonetheless practicing the novel concepts described and claimed herein; accordingly, it is intended that all such modifications and substitutions be embraced insofar as they fall within the spirit and scope of the appended claims.

What is claimed is:

1. An improved method of providing manipulating a floppy disk file comprising:

arranging and forming flexible data processing record disks so that each includes a prescribed like engagement edge extending radially at a certain point on the disks's periphery, this engagement edge comprising an indentation along a prescribed segment of the disk edge, this indentation being formed as a gradual recession, radially inward along said segment, this recession terminating, relatively abruptly, in said edge;

stacking the disks into a pack so that each said engagement edge is disposed at a different angular position about the stack circumference; and providing automatic disk-file partition means adapted to split the disk pack and expose a selected disk surface by timed engagement with a prescribed one of the engagement edges; while rotating said stack and providing data processing transducer means adapted to operate upon said selected disk surface by timed entry into the pack so-split.

2. The combination as recited in claim 1, wherein, after selecting a prescribed disk surface to be exposed for recording operations, partition means are provided adjacent the periphery of said stack while rotating said stack controllably, then, stack rotation is monitored and said partition means is thrust into contact with a designated cam-edge as this edge passes, the designated edge being formed in the disk including said selected recording surface or adjacent thereto; then further thrusting said partition means so as to initiate a partition gap between said selected surface and the adjacent disk; then further thrusting said partition means into said gap so as to enlarge the gap and cause further partitioning, this partition means being arranged to pivot said designated edge away from the selected disk surface to generate said gap.

3. The combination as recited in claim 2, wherein said partition means comprises wedge means, mounted on the distal end of actuate means, said wedge means being thrust transverse of the pack axis by said actuate means to initiate cam-edge engagement and gap opening, and then further thrust into the gap so generated to enlarge the partition gap.

4. The combination as recited in claim 3, wherein elongate, semi-conical wedge-shaped hood means is provided conjunctively with said wedge means and adapted to facilitate the further deflection and compliant partitioning of the stack when the partition means is thrust ever further into the stack.

5. The method of claim 1, wherein:

said disks are of identical size; wherein said cam-edges therein extend a constant radial distance from the periphery of each disk; and wherein said disks are so stacked that said indentations are "overlapping".

6. An improved partitionable disk pack array comprising at least one stack of like recording disks, each disk having a prescribed like radially-extending indentation segment at a prescribed point on its periphery along with an adjacent taper-segment formed as a gradual recession radially of said periphery terminating at said indentation segment; the disks being stacked so that a portion of each said segment is disposed at a different angular position about the circumference of the stack; the disks comprising flexible disks having a magnetic recording zone on at least one surface thereof and being stacked with said indentation segments overlapping, sequentially.

7. The combination as recited in claim 6, included as part of a disk file arrangement which also includes partition means adapted to engage a selected one of said segments during rotation of a stack and to thrust the associated disk deflectingly away from a "selected" disk-recording-surface to initiate pack partition.

8. The combination as recited in claim 7, wherein said partition means comprises a partitioning wedge disposed at the distal end of linear actuate means adapted to so deflect a selected disk, resiliently, together with all disks therebehind, thereby defining a prescribed partition gap; the linear actuate means being constrained against moving axially of said pack.

9. The combination as recited in claim 8, wherein each said segment includes a cam-edge; wherein said wedge includes lateral bevel portion adapted to engage a selected one of said edges, and urge it axially of the stack to generate said gap opening; and wherein said partition means also includes a wedge-like, semi-conical hood means and magnetic transducer means mounted protectively therewithin.

10. The combination as recited in claim 7, wherein said disk array comprises a plurality of said disk stacks mounted on a common spindle for co-rotation, each stack being arranged with an overlapping indentation arrangement and wherein a single partition means is adapted to be translated axially of the overall pack array to register with a selected one of said stacks.

11. In combination, a partitionable flexible disk pack comprising at least one stack of disks, each disk having a prescribed peripheral "indentation-segment" and adjacent taper-segment and being arrayed in its stack so that portion of each indented segment is disposed at a prescribed unique angular position circumferentially about the stack; and partition means poised along a locus adjacent the stack, and adapted to engage any selected one of said disks by a timed thrust along this locus when that disk's segment intersects the locus, whereby to effect axial deflection of the associated disk and an associated exposure of the opposing disk surface for transducing operations, this partition means thereby opening and defining a prescribed partition gap adjacent to this disk surface.

12. A method of providing improved disk file manipulation comprising:

arranging and forming flexible data processing record disks of prescribed "nominal-radius" so that each includes a prescribed like "engagement edge", extending radially at a certain point on the disk periphery and so that each includes a like adjacent "inset-segment" subtending a prescribed sectorial angle and being formed by progressively reducing the radial distance to the disk periphery along the segment so that the segment terminates in abutment with the associated edge, the edge extending radially-outward therefrom to terminate at the nominal-radius disk periphery;

stacking the disks so that each said "engagement edge" is disposed at a different angular position about the stack circumference;

providing partition means adapted to split the disk pack and expose a selected disk surface by timed engagement with a prescribed one of the "engagement edges", while rotating the stack; and providing data processing transducer means adapted to operate upon said selected disk surface by timed entry into the pack so split.

* * * * *